March 29, 1960     W. C. ROHN     2,930,602
GAS ANALYSIS CRUCIBLE
Filed Nov. 25, 1957
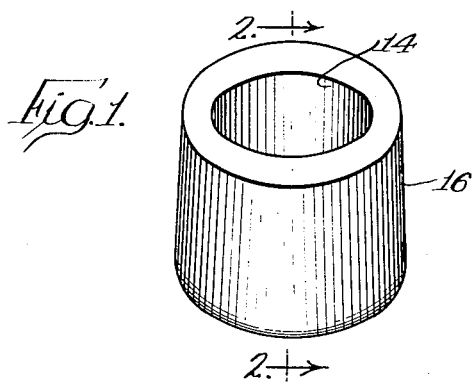
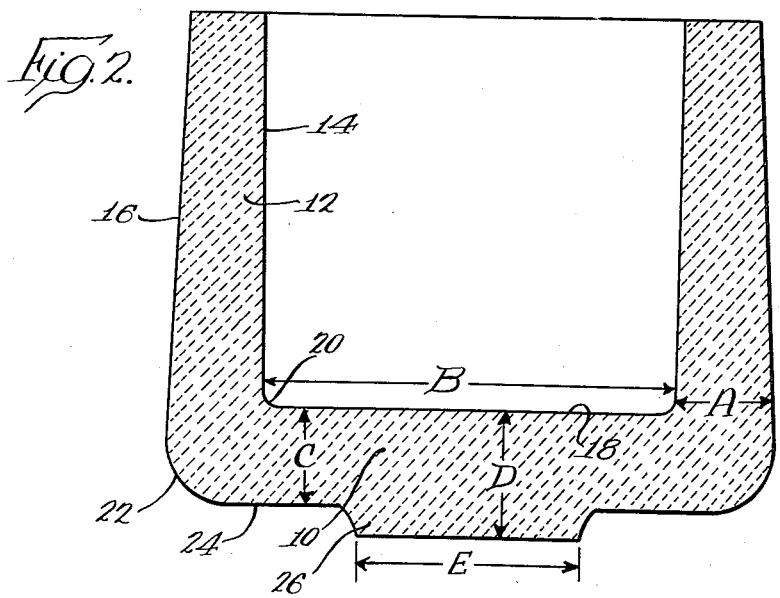
INVENTOR.
William C. Rohn
BY
Wupper, Gradolph & Love
Attys.

United States Patent Office 2,930,602
Patented Mar. 29, 1960

2,930,602

GAS ANALYSIS CRUCIBLE

William C. Rohn, St. Joseph, Mich., assignor to Laboratory Equipment Corporation, St. Joseph, Mich., a corporation of Michigan Application November 25, 1957, Serial No. 698,415

2 Claims. (Cl. 263—48)

The present invention relates to crucibles, and more particularly to miniature ceramic crucibles of the general character illustrated in George J. Krasl United States Patent No. 2,809,100 for Combustion Analyzer.

The combustion analyzer forming the subject of the above patent is now widely used and has become comparatively standard in industry for the analysis of a wide range of combustible materials for carbon, and with minor changes for the determination of sulphur content. A crucible for use in such apparatus is approximately an inch or so high, and should fit within a vertical cylindrical tube having the standard diameter of approximately 35 millimeters which serves as the combustion chamber.

Crucibles of the type contemplated are normally used once and then discarded. They may be formed of any of ceramic materials of a highly refractory nature, and are subjected to extremely high thermal stress during a determination.

A typical determination is conducted as follows. A quantity of powdered iron or other combustible material, sometimes a mixture of materials, is placed in the crucible which in turn is located within the combustion chamber and surrounded by an atmosphere of substantially pure oxygen. In this environment, the charge within the crucible is subjected to a high energy radio frequency induction field which quickly raises the temperature of the charge to the combustion point, such that the iron or steel powder or other material burns in the atmosphere of oxygen at an extremely high temperature. The resulting gases are then analyzed for carbon or sulphur.

The result is that not only is the crucible subjected to extremely high temperatures suddenly, but unlike the conditions which usually prevail, there is a very high temperature gradient from the inside outwardly. Stated differently, the crucible is heated from the inside by the burning charge while the outside is cooled by radiation to the cool surroundings.

The thermal stresses are such that it appears to be impossible with materials of reasonable cost to provide a crucible which can be depended upon not to crack in service. Cracks that thus develop are of no particular consequence excepting that they permit the melted material within the crucible to flow outwardly through the crack and thus contaminate the apparatus, particularly the artificial quartz tube which generally serves as the side wall of the combustion chamber. Unfortunately, all previously used crucibles tend to fracture horizontally, usually below the level of the molten charge, with the result that when a crack does occur, seepage can take place along its full length. Frequently, in fact, the crack extends all the way around so as to separate the cylindrical side wall from the bottom portion and thus permits the molten material to gush out uncontrollably.

It is the principal object of the present invention to provide a greatly improved low cost ceramic crucible which is much more resistant to thermal shock than those heretofore in use.

Still another object is to provide an improved crucible of the above type which, when subjected to sufficient thermal stress to cause fracture, always cracks vertically rather than horizontally so as to expose only a small fracture length to the melted charge low down within the crucible.

Yet another object is to provide a novel small diameter cylindrical crucible which is highly resistant to fracture and which ultimately fractures vertically under conditions where the temperature within the crucible is extremely high as compared to the external temperature.

Still another object is to so proportion the section of ceramic material in the walls and bottom of a cylindrical crucible that rapid internal heating of the crucible, if great enough to cause fracture, will produce a fracture line in a vertical rather than a horizontal direction.

Other objects and advantages will become apparent from the following description of a preferred embodiment of my invention which is illustrated in the accompanying drawings.

In the drawings, in which similar characters of reference refer to similar parts throughout the several views, Figure 1 is a perspective view of a crucible embodying features of the invention; and Fig. 2 is a greatly enlarged vertical medial sectional view through the crucible which may be considered as taken in the direction of the arrows substantially along the line 2—2 of Fig. 1.

The crucible shown in the drawings has a generally flat bottom and approximately cylindrical side wall extending upwardly therefrom. It is approximately 1 to 1⅛ inches high, and has a maximum external diameter of from 1⅛ to 1³⁄₁₆ inches so as to fit within a standard 35 millimeter tube which forms the combustion chamber. As previously explained, crucibles of this general character have in the past exhibited a strong tendency to fracture near the base when the temperature inside the crucible was rapidly elevated, and, furthermore, fracture almost universally occurred horizontally, sometimes extending all of the way around the crucible so as to separate the side wall portion from the base.

In the present instance, the crucible may be considered as being suitable for manufacture from the same material as customarily used; that is, any of the several types of highly refractory ceramics. For this purpose I prefer, considering chemical resistance, the general physical values provided, and the cost, to use sintered zircon refractory ware.

As shown, the crucible has a generally flat base 10 with a generally cylindrical side wall 12 upstanding therefrom. The internal side wall surface 14 tapers slightly outwardly from the vertical so as to make an angle of from about ½ degree to one degree therewith. The external surface 16 is tapered more sharply inwardly at an angle of from about 2 to 4 degrees from the vertical. The section through the material of which the crucible is formed is therefore less at the top than it is through the lower portion of the side wall. In order to accomplish the objectives previously mentioned, I have found that the horizontal section A through the lower portion of the side wall should not be less than ³⁄₁₆ inch, and that the taper upwardly therefrom should be approximately constant, although it may be at a somewhat greater rate near the top. The internal diameter B of the cavity within the crucible is from about 1³⁄₁₆ to ¾ inch, and the bottom interior surface 18 is flat and horizontal. This interior surface is joined to the side wall by a generous radius 20 which should be not less than 1/32 inch. Externally, the side wall is connected to the bottom surface by a radius 22 which should be not less than 1/8 inch, and the external bottom surface 24 is generally flat excepting for a thicker section at the center exemplified by the downwardly extending boss 26. With the exception of this boss 26, the section C through the bottom of the wall of the crucible should not be greater than 17/64 inch, but preferably should be less, of the order of 3/16 inch. The central portion D—that is, the portion which includes the thickness contributed by the boss 26—must be at least 1/4 inch, and, in any event, should have a thickness ratio as compared with the surrounding bottom portion of about 4 to 3. The diameter E of the boss 26, where it fairs into the surrounding surface, should be from 3/8 inch to about 1/2 the external crucible diameter. The boss is therefore substantial, but should not constitute the entire bottom area inwardly of the internal side walls.

A crucible so manufactured will crack vertically, and provides an internal diameter for the accommodation of the charge which is substantially maxmium considering the fact that the crucible must fit within a 35 millimeter tube and have sufficient clearance therearound for the passage of the gas stream. The material placed within the crucible therefore forms a relatively uniform mass which is well adapted to be heated by induction, and additionally, for any given mass of charge, forms a pool of minimum thickness from top to bottom. The enlargement of the central portion bottom section as exemplified by the boss 26 contributes essential strength in this location which combines with the somewhat thinner bottom portion outwardly therefrom in preventing internal high temperature shocks from producing a fracture through the bottom of the article. This, together with the generous radii connecting the side walls internally and externally with the bottom portion, the rather thick bottom side wall, and the gradual taper upwardly therefrom, has the effect of so distributing the stresses due to internal heating that fracture, if it takes place, will occur vertically.

Since the pool of molten burning material within the crucible is comparatively shallow, it will be appreciated that a vertical crack extending downwardly through the side wall, even if it extends entirely to the bottom wall portion, will not expose a length of fracture which will permit the passage of any appreciable amount of the charge, particularly when it is considered that the molten material, in seeping outwardly through the crack, will tend to solidify as it approaches the colder exterior surface. This is particularly true since any fracture that takes place will not extend below the lower portion of the side wall, and such a crack will be tapered from top to bottom so that, although the top separation may be appreciable, the crack will be of a very narrow hair-line nature toward the bottom.

The inward taper at the top is also helpful in that it increases the space between the top of the crucible and the wall of the tube forming the combustion chamber. If, therefore, any molten slag boils over the top edge, it can run down the outside of the crucible with less possibility of it coming into contact with the combustion chamber wall.

From the above description of a preferred embodiment of my invention it will be appreciated that variations may be made without departing from the scope of the invention, and that the scope of the invention is to be measured by the scope of the following claims.

Having described my invention, what I claim as new and useful and desire to secure by Letters Patent of the United States is:

1. A miniature ceramic laboratory combustion crucible adapted for internal heating at an extremely high rate by the combustion therein of a combustible substance burning in a substantially pure oxygen atmosphere and adapted to fit within a standard vertical 35 millimeter combustion tube, said crucible having a generally circular horizontal bottom and an annular side wall upstanding therefrom so as to form a cavity to receive a test sample, the interior bottom surface of said crucible being flat and the interior side wall surface tapering outwardly slightly from the bottom to the top, the external side wall being frustoconical and tapering inwardly from the bottom to the top at a rate greater than the internal side wall taper, the internal side wall being joined to the internal bottom surface by a radius of at least 1/32 inch, the external side wall surface being joined to the external bottom surface by a radius of at least 1/8 inch, said crucible being so proportioned that the ratio of the thickness through the bottom of the crucible at a center zone to the thickness through the bottom outwardly thereof substantially 4 to 3, that the thickness through the bottom outwardly of the center zone is no more than the thickness of the side wall near the bottom internal surface, that the diameter of the thicker bottom center zone is less than one-half the external crucible diameter and no less than 3/8 inch, and that the thickness through the bottom outwardly of the center zone is from 3/16 to 17/64 inch.

2. A miniature ceramic internally heated laboratory combustion crucible having an external diameter of from 1 to 1 1/4 inches, said crucible having a generally circular horizontal bottom and an annular side wall upstanding therefrom so as to form a cavity to receive a test sample, the interior bottom surface of said crucible being flat and the interior side wall surface tapering outwardly slightly toward the top, the external side wall being frustoconical and tapering inwardly from the bottom of the top at a rate greater than the internal side wall taper, the internal side wall being joined to the internal bottom surface by a radius of at least 1/32 inch, the external side wall surface being joined to the external bottom surface by a radius of at least 1/8 inch, said crucible being so proportioned that the ratio of the thickness through the bottom of the crucible at a center zone to the thickness through the bottom outwardly thereof is substantially 4 to 3, that the thickness through the bottom outwardly of the center zone is not substantially more than the thickness of the side wall adjacent the bottom internal surface, and that the thickness through the bottom outwardly of the center zone is no more than 17/64 inch.

References Cited in the file of this patent

UNITED STATES PATENTS

| | | |
|---|---|---|
| 2,195,436 | Weller | Apr. 2, 1940 |
| 2,543,700 | Leitten et al. | Feb. 27, 1951 |

FOREIGN PATENTS

| | | |
|---|---|---|
| 575,793 | Germany | May 2, 1933 |